United States Patent [19]
Casey

[11] Patent Number: 6,070,607
[45] Date of Patent: Jun. 6, 2000

[54] DIFFERENTIAL PRESSURE SUPPLY SYSTEM

[76] Inventor: Gary L. Casey, 3981 Corte Cancion, Thousand Oaks, Calif. 91360

[21] Appl. No.: 09/225,698

[22] Filed: Jan. 6, 1999

[51] Int. Cl.[7] .................................................. G05D 16/06
[52] U.S. Cl. ...................... 137/87.01; 137/595; 137/597; 137/907; 244/1 R
[58] Field of Search ................................ 137/87.01, 595, 137/597, 907; 244/1 R; 60/605.1

[56] References Cited

U.S. PATENT DOCUMENTS

| | | | |
|---|---|---|---|
| 1,948,044 | 2/1934 | Myers et al. | 137/87.01 |
| 3,580,284 | 5/1971 | Bini et al. | 137/625.18 |
| 4,705,233 | 11/1987 | Henry | 244/1 R |
| 5,188,141 | 2/1993 | Cook et al. | 137/112 |
| 5,291,916 | 3/1994 | Kloosterman et al. | 137/112 |

*Primary Examiner*—Stephen M. Hepperle

[57] ABSTRACT

A control system for producing first and second fluid sources whose pressure difference is regulated to a desired value in response to four fluid supplies of independently variable pressures. The pressure of the first fluid source is not allowed to decrease substantially below the third fluid supply pressure or rise substantially higher than the desired value above the pressure of the third fluid supply. The pressure of the second fluid source is not allowed to rise substantially above the fourth fluid supply pressure or decrease substantially lower than the desired value below the pressure of the third fluid supply. The system may consist of a diaphragm-type pressure regulator which is responsive to the difference in pressure of the two fluid sources. One side of the regulator is selectively valved to connect to one of two pressure supplies while the other side is selectively valved to connect to one of two additional pressure supplies.

23 Claims, 2 Drawing Sheets

DIFFERENTIAL PRESSURE SUPPLY SYSTEM

BACKGROUND AND SUMMARY OF THE INVENTION

This invention generally relates to devices used to regulate the pressure of a fluid supply and more specifically to the design of a pressure regulator valve capable of providing a duplex of fluid sources with a substantially constant differential pressure regardless of the fluctuation in pressure of multiple fluid supplies.

Most general aviation aircraft utilize gyroscopic instruments as the primarily flight control inputs for flying without reference to the horizon. These instruments are driven either by differential air pressure or electricity. In order to provide the maximum redundancy, especially in an aircraft with a single reciprocating engine, some of these instruments are driven by electricity and some by differential pressure. The vacuum supply (or positive pressure in some cases) is typically a vane-type pump driven by the engine. These pumps, operating at approximately 5 inches mercury differential pressure, are considered to be among the least reliable devices on the aircraft. There have been a number of improvements proposed to reduce the dependency on the pump or to provide a back-up system. Some aircraft utilize 2 pumps driven by the same engine for redundancy, sometimes with a clutch driving one in order to reduce wear on the back-up pump. Another method is to provide an electric motor-driven back-up pump, but this is heavy and expensive and significantly increases the electrical load when the primary vacuum pump fails. A low cost solution has been to use the natural vacuum that exists in the intake manifold of a reciprocating engine for the source. This, and many of the other devices, must use a manual valve to activate the stand-by source, increasing the pilot workload. When using the intake manifold as a source that vacuum is only available at partial engine load, forcing the operator to reduce the engine power to supply air to the instruments. Also, this approach is not effective with supercharged engines which are being used in increasing numbers in light aircraft, because the manifold pressure is above atmospheric in most operating conditions.

In one of a number of possible applications, a pressure regulator valve described by the present invention can effectively utilize pressure in the intake manifold of a turbocharged engine to provide a supply differential pressure. Moreover, it is able to provide this differential pressure source at all normally used power settings. There are two pressure taps taken from the engine, one at the compressor (supercharger) outlet and the other at the intake manifold downstream of the throttle valve. Additional pressure ports are vented to atmospheric pressure. The device will automatically utilize the highest pressure available for the instrument source and the lowest available pressure for the discharge with priority given to operation with the upstream side vented to atmosphere and the downstream side at a relative depression. This system operates with such reliability that a redundant or back-up system is unnecessary.

This invention combines common components (diaphragms, springs, disc valves, etc.) in such a way as to perform a function not possible with conventional technology. This function is the supply of a differential pressure source that is adequate—in this case to power flight instruments—when neither the high pressure source or the low pressure source are always adequate for the task.

The advantages of the present invention when used to replace existing technology instrument drive systems for light aircraft include lower cost, lower weight and greater reliability.

DETAILED DESCRIPTION OF THE DRAWINGS

Figure 1:
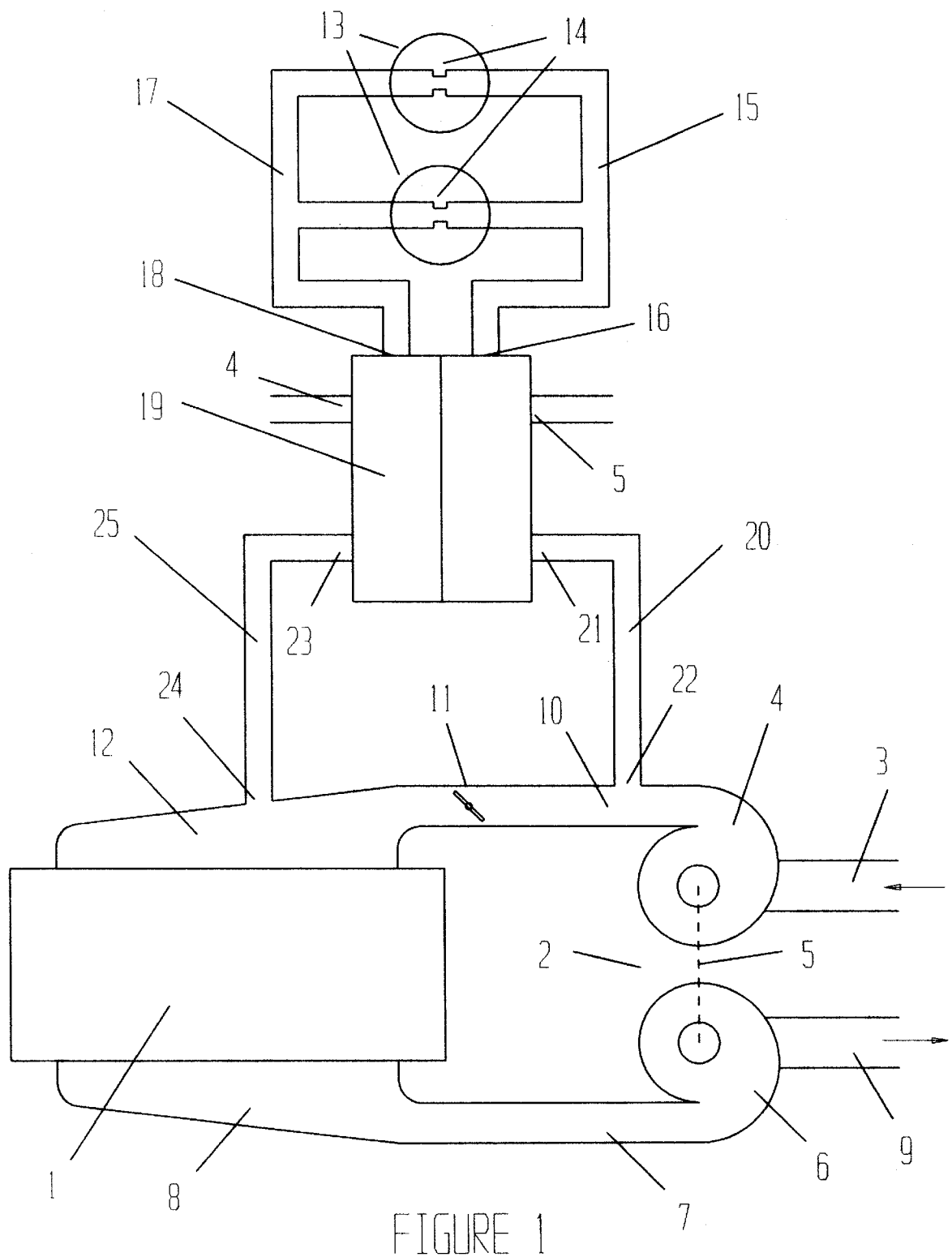
FIG. 1 shows a schematic representation of a typical application of the present invention. Shown is the arrangement of the air intake and exhaust system of a typical turbocharged reciprocating engine and a block diagram of the air supply system for flight instruments including the present invention.

Referring to FIG. 1, a conventional reciprocating engine 1 of known technology is shown in block form coupled to a turbocharger 2, shown schematically, also of known technology. Air enters the engine at the atmospheric inlet 3, is compressed to a higher pressure by the turbocharger compressor 4. The compressor is driven through a shaft 5 by the turbine 6 which is, in turn, powered by the stream of exhaust gas 7 from the exhaust manifold 8. The exhaust is discharged to the atmosphere from the exhaust pipe 9. The air compressed by the compressor 4 passes through the compressor discharge passage 10, a throttle valve 11 of known technology and into the intake manifold chamber 12 where it is distributed to the various cylinders of the engine. The aircraft flight instruments shown schematically at 13 require an air pressure source at the proper pressure and with adequate flow capability, typically under at least 4.5 and less than 5.5 inches of mercury (in. Hg.) differential pressure. The figure shows two such instruments, but there may be fewer or more within the scope of the present invention. For the purpose of the description the air passage in each instrument can be shown as an orifice 14. The air is introduced to the instruments through the passages 15 connected to the pressure regulator high pressure port 16 and is discharged through the passages 17 to the pressure regulator low pressure port 18. The pressure regulator valve 19 is connected to the engine by the passage 20 that connects the high pressure port 21 to the compressor discharge passage at port 22. The pressure regulator valve low pressure port 23 is connected to the engine intake manifold 12 through the passage 25 at the port 24.

When the engine is started., air that is drawn into the engine past the throttle valve 11 creates a reduced pressure at port 24. At the same time high temperature exhaust flow exiting the engine through exhaust manifold 8 flows through the passage 7, rotating the turbine 6, which in turn drives the compressor 4 through the shaft shown schematically at 5. The rotating compressor draws atmospheric air through the inlet 3, raises the pressure and discharges it into passage 10. The throttle 11 is opened by the operator to the degree necessarily to regulate the pressure in the intake manifold 12 and, hence, allow the engine to produce the power desired. During all operating conditions the compressor discharge pressure in passage 10 and port 22 will be higher than the pressure in the intake manifold 12 and port 24, which could be either higher or lower than atmospheric depending on the operating condition. Typically, the compressor discharge pressure can vary from atmospheric to 20 in. Hg. above atmospheric and the intake manifold pressure can vary from 20 in. Hg. below atmospheric to 20 in. Hg. above atmospheric. At the lightest engine load with the throttle nearly closed, such as an idling condition, the compressor discharge will be at essentially atmospheric and the intake manifold will be at approximately 20 in. Hg. below atmospheric. At maximum load conditions with the throttle fully open both the compressor discharge and intake manifold will be at a pressure up to 20 in. Hg. above atmospheric.

Figure 2:
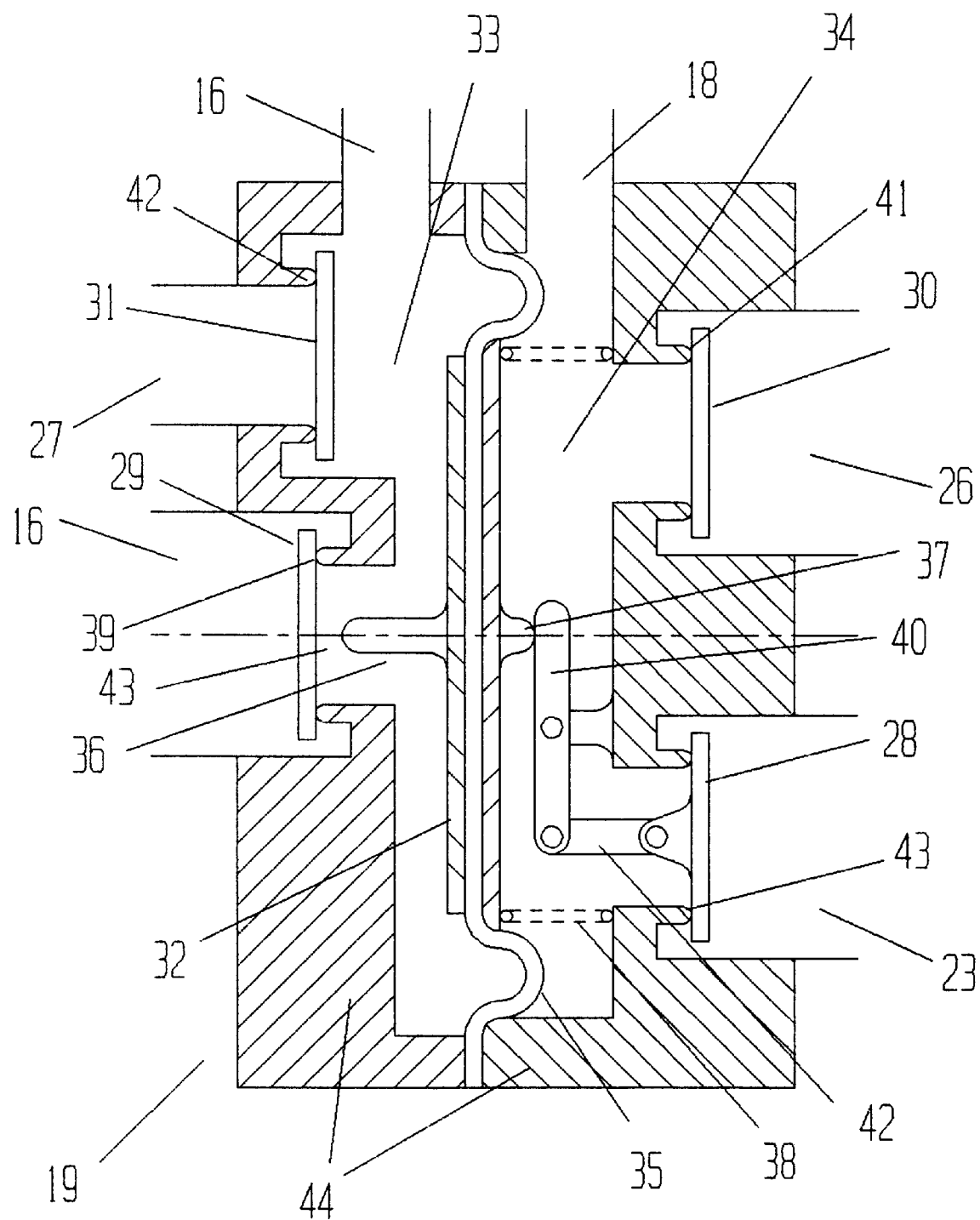
FIG. 2 is a detailed diagram of the present invention shown as a cross-section through the center of the pressure regulator valve.

Referring to FIG. 2 the pressure regulator 19 contained within housing 44 is provided with a high pressure supply port 16, a low pressure supply port 23, ports 26 and 27 connecting to a third fluid supply which in this case is atmospheric, source ports 16 and 18. Appropriate valves 28, 29, 30, and 31, preferably of discoidal shape to be described herein are placed at respective ports. The respective valves seal against valve seats 43, 39, 41, and 42. A movable partition 32 separates the high pressure chamber 33 from the low pressure chamber 34. The partition is of conventional construction known to those skilled in the art and is typically constructed of the rigid portion 32 and a flexible diaphragm portion 35 that allows the partition to move within the space available while not allowing leakage between the high pressure and low pressure chambers. Alternate implementations, such as the use of a sliding seal, would also be effective. Protrusion 36 presses against, but is not connected to valve 29 and similarly protrusion 37 presses against lever 40 which freely pivots at pivot point 41. The opposite end of lever 40 is flexibly connected by the link 42 to the valve 28. A means of biasing the partition 32 toward the high pressure chamber 33 is illustrated by the spring 38, but other biasing means would be equally effective. When the partition is forced against the biasing spring fully closing valve 28 there exists a substantial clearance 43 between the protrusion 36 and valve 29. The valves can be of a number of different configurations, but the flat disc valves illustrated work well and are preferred.

For the purpose of illustration it is helpful to divide the engine operation into a number of different modes that describe all the possible operating modes of the present invention. First is the "engine off" mode when there is no air flow or pressure differences throughout the system. Second is the "light load" condition when the throttle is partially open and there exists a depression in the intake manifold more than required to operate the instruments. Third is the "high load" condition when the throttle is fully open and all pressures in the system are above atmospheric by more that the pressure required to operate the instruments. The Fourth mode is at partial load where neither the compressor discharge pressure or the intake manifold pressure are sufficiently different from atmospheric to operate the instruments, but the difference between the two pressures are more that the instruments require.

In the first mode, before the engine is started, the air pressure is equal on both sides of the partition 32, which is urged toward the high pressure chamber 33 by the spring 38, forcing the valve 29 away its seat 39 thereby connecting the high pressure chamber 33 to port 16. At the same time, the partition moves away from the lever 40 allowing the valve 28 to freely open.

In the second mode the engine is running at light load with the throttle significantly restricting the air flow into the engine, creating a pressure in the intake manifold substantially below atmospheric. The pressure in chamber 34 is higher than the pressure in port 23 thereby allowing the valve 28 to open, connecting the chamber 34 to the intake manifold via port 23. Since chamber 34 is now below atmospheric, atmospheric pressure urges valve 30 against its seat 41. Chamber 33 is connected to the compressor discharge pressure because the bias spring 38 forces the partition to the left, forcing valve 29 off its seat 39. The pressure difference between chambers 33 and 34 creates flow through the instruments, which in turn produces a pressure differential because of the restriction of the orifices 14. When the pressure differential rises sufficiently to move the partition against the force of the bias spring, the valve 29 is allowed to close. Flow through port 16 causes the pressure in chamber 33 to drop below atmospheric, allowing valve 31 to be urged off its seat 42 by atmospheric pressure in port 27. As the partition is urged further against the bias spring by the pressure difference between chambers 33 and 34 valve 28 is closed until the differential pressure is stabilized at an equilibrium position. The upstream side of the instruments are therefore connected to atmospheric pressure and the downstream side is regulated at the proper pressure as long as a sufficient depression exists in the intake manifold.

In the third mode the engine is operating at a high load condition with the throttle valve essentially fully open and with the intake manifold at a pressure above atmospheric by more than is required to operate the instruments. The at port 23 is above atmospheric, initially forcing the pressure in chamber 34 to be above atmospheric. Valve 30 is then urged off its seat 41, allowing the pressure in chamber 34 to be vented to atmosphere. The higher pressure at poll 23 then urges valve 28 against its seat 43. Chamber 34 is now vented to atmospheric pressure. The high pressure at port 16 is transferred to chamber 33 by the open valve 29, urging valve 31 against its seat 42. The pressure differential between chambers 33 and 34 urges the partition against the biasing spring, allowing valve to begin to close until the pressure in chamber 33 is reduced to an equilibrium condition. In this mode the downstream pressure at the instruments is atmospheric and the upstream pressure is regulated at the proper value as long as the compressor discharge pressure is adequate.

In the forth mode, neither the intake manifold depression or the compressor discharge pressure is adequate to power the instruments. Chamber 34 is connected to either intake manifold pressure through valve 28 or to atmospheric through valve 30, whichever pressure is less. The bias spring then urges the partition against valve 29, opening it sufficiently to produce the required pressure differential. In this mode, the differential pressure supplied to the instruments is adequate as long as the difference between the higher of either compressor discharge or atmospheric pressure and the lower of either atmospheric or intake manifold pressure is adequate.

In summary, a means has been described to provide a regulated differential pressure as long as the difference between the highest and lowest pressures of the three pressure sources are sufficient. While a specific application to provide air pressure for aircraft instruments has been described any number of applications are possible within the scope of the present invention.

Having described the Pressure Supply System in detail, it is submitted that one skilled in the art will be able to make certain changes in the structure illustrated in the drawings and described in the specification without departing from the spirit of the invention as set forth in the appended claim.

claimed is:

1. A control system for producing first and second fluid sources whose pressure difference is regulated to a desired value in response to four fluid supplies of independently variable pressures where the pressure of the first fluid source is not allowed to decrease substantially below the third fluid supply pressure or rise substantially higher than the desired differential pressure above the pressure of the third fluid supply; while the pressure of the second fluid source is not allowed to rise substantially above the fourth fluid supply pressure or decrease substantially lower than the desired differential pressure below the pressure of the third fluid supply.

2. Claim 1 where the pressure of the third fluid supply is atmospheric.

3. Claim 1 where the fluid is atmospheric air.

4. Claim 2 where the fluid is atmospheric air.

5. Claim 4 where the first fluid supply is the compressor discharge port and the second fluid supply is the intake manifold of a supercharged reciprocating engine.

6. Claim 5 where the first and second fluid sources are used to deliver air to gyro instrument systems for aircraft.

7. A control system for producing first and second fluid source pressures in response to four independent fluid supplies and whose difference is regulated to a desired value while the first fluid source pressure is not allowed to rise substantially higher than the pressure of a first fluid supply or decrease substantially below the pressure of a third fluid supply, and while the second fluid source pressure is not allowed to rise substantially above the fourth fluid supply pressure.

8. Claim 7 where the pressures of the third and fourth fluid supply are atmospheric.

9. Claim 7 where the fluid is atmospheric air.

10. Claim 9 where the fluid is atmospheric air.

11. Claim 10 where the first fluid supply is the compressor discharge port and the second fluid supply is the intake manifold of a supercharged reciprocating engine.

12. Claim 11 where the first and second fluid sources are used to deliver air to gyro instrument systems for aircraft.

13. A fluid supply system comprising a movable element responsive to fluid pressure biased in a first direction by a biasing element and a second source pressure while being biased in the second direction by a first source pressure where the movable element when moved in the first direction is used to force open a first valve member connecting the first fluid source to a first fluid supply, said valve being normally biased in the closed position if the first fluid supply pressure is higher than the first fluid source pressure, but free to open if the first fluid source pressure is higher than the first fluid supply pressure; and conversely, when the movable element is biased in the second direction against the force of the biasing element a second valve member connecting the second fluid source to a second fluid supply is forced closed, said valve member also being biased closed if the second fluid supply pressure is higher than the second fluid source pressure, but otherwise free to open if the second fluid source pressure is higher than the second fluid supply pressure; the first fluid source being also connected to a third fluid supply by a third valve member that is biased closed if the first fluid source pressure is higher than the third fluid supply pressure, and the second fluid source being also connected to a fourth fluid supply by a fourth valve member that is biased closed if the fourth fluid supply pressure is higher than the second fluid source pressure, the third and fourth valve members being free to open if not biased closed.

14. Claim 13 where the movable element is a flexible diaphragm.

15. Claim 13 where the valve elements are discoidal poppet valves.

16. Claim 13 where the first and second supply pressures are provided by the compressor discharge and the intake manifold, respectively of a supercharged reciprocating internal combustion engine and the third and fourth fluid supplies are provided by the atmosphere.

17. Claim 16 where the first and second fluid sources are used to deliver air to gyro instrument systems for aircraft.

18. A control system for producing first and second fluid source pressures, the first fluid source being higher in pressure than the second fluid source, in response to four independent fluid supplies and whose difference is regulated to a desired value: Whereby the first fluid source pressure is not allowed to rise substantially higher than the pressure of a first fluid supply or decrease substantially below the pressure of a third fluid supply, and while the second fluid source pressure is not allowed to rise substantially above the fourth fluid supply pressure; provided that the pressure of the first fluid supply is higher than that of the third fluid supply or that the pressure of the fourth fluid supply is higher than that of the second fluid supply or that the pressure of the first fluid supply is higher than that of the second fluid supply by an amount substantially equal to the desired value of the pressure difference of the first and second fluid sources.

19. Claim 18 where the pressures of the third and fourth fluid supply are atmospheric.

20. Claim 18 where the fluid is atmospheric air.

21. Claim 19 where the fluid is atmospheric air.

22. Claim 20 where the first fluid supply is the compressor discharge port and the second fluid supply is the intake manifold of a supercharged reciprocating engine.

23. Claim 22 where the first and second fluid sources are used to deliver air to gyro instrument systems for aircraft.

* * * * *